United States Patent [19]

Feldman et al.

[11] Patent Number: 4,750,202
[45] Date of Patent: Jun. 7, 1988

[54] NON-BLOCKING CONCENTRATOR

[75] Inventors: Paul N. Feldman, Brooklyn, N.Y.; Joel Friedman, Berkeley; Nicholas J. Pippenger, San Jose, both of Calif.

[73] Assignee: International Business Machines Corporation, Armonk, N.Y.

[21] Appl. No.: 898,066

[22] Filed: Aug. 20, 1986

[51] Int. Cl.$^4$ .............................................. H04Q 3/60
[52] U.S. Cl. .................................... 379/335; 379/337
[58] Field of Search ............... 379/335, 337, 274, 277, 379/291, 292

[56] References Cited

U.S. PATENT DOCUMENTS

| | | | |
|---|---|---|---|
| 3,935,394 | 1/1976 | Bulfer | 379/245 |
| 3,943,297 | 3/1976 | Pommerening et al. | 379/244 X |
| 4,245,214 | 1/1981 | Bierne | 340/166 R |

OTHER PUBLICATIONS

M. S. Pinsker "On the Complexity of a Concentrator" Proc. Internat. Teletraffic Conf. 7 (1973) 318/1-4.
L. A. Bassalygo and M. S. Pinsker, "Complexity of an Optimum Nonblocking Switching Network Without Reconnections" Prob. Info. Transm., 9(1973) 64-66.
G. A. Margulis, "Explicit Constructions of Concentrators", Prob. Info. Transm., 9 (1973) 325-332.
A. Feiner and W. S. Hayward, "No. 1 ESS Switching Network Plan", Bell Sys. Tech. J., (1964) 2193-2220.
G. M. Masson, "Binomial Switching Networks for Concentration and Distribution", IEEE Trans. on Comm., 25 (1977) 875-883.
N. Pippenger, "Telephone Switching Network", Proc. of Symposia in Applied Mathematics, vol. 26, (1982) 101-133.

Primary Examiner—James L. Dwyer
Attorney, Agent, or Firm—Mark A. Haynes; Henry E. Otto, Jr.

[57] ABSTRACT

The present invention provides a single stage crossbar and a controller for controlling the crossbar that provides a capacity for "wide-sense non-blocking" connection of input signals to outputs that exceeds the number of outputs to which a given input is connected. Thus, the capacity of the crossbar is increased using a smaller number of crosspoints in a single stage than was available in the prior art.

In one aspect, the present invention is an apparatus for connecting a signal on one of a plurality of inputs to a non-busy one of a plurality of outputs, comprising a plurality of controllable switches arranged so that each input is connectable to at least an integer q outputs and so that no two inputs share more than an integer c outputs. The invention further comprises a controller for controlling the controllable switches to connect the signal to a non-busy output so that no more than an integer f outputs that are connectable to any input become busy, where f is less than q.

12 Claims, 4 Drawing Sheets

NON-BLOCKING CONCENTRATOR

FIELD OF THE INVENTION

This invention relates to the problem of constructing and operating a network, known as a concentrator, in which inputs are connected to outputs by means of controllable switches.

BACKGROUND OF THE INVENTION

Concentrators of various types are in common use in large switching systems like telephone exchanges. In a telephone exchange, typically a large number of input lines must be concentrated into a smaller number of trunks for transmission of the telephone signals. A concentrator consists of a crossbar made up of a number of controllable crosspoint switches that connect a given input to a given output.

For very large systems, the cost of the crossbar switch is quite high because of the large number of crosspoints implemented by electromechanical switches. For instance, for a crossbar having 100 inputs and 10 outputs, in order to assure full accessibility in a single stage crossbar by any input to each output, the crossbar would require 1000 crosspoint switches.

In order to reduce the cost of crossbar switches, a wide variety of concentrators has been developed that reduce the number of crosspoints required to assure an acceptable level of accessibility by a given input to an available output.

Representative systems of the prior art are described in the following sources:

M. W. Pinsker, "On the Complexity of a Concentrator", Proc. Internat. Teletraffic Conf., 7 (1973) 318/1-4. (Multistage rather than direct networks; rearrangeable rather than non-blocking operation; probabilistic construction—no reduction to practice.)

L. A. Bassalygo and M. S. Pinsker, "Complexity of an Optimum Nonblocking Switching Network without Reconnections", Prob. Info. Transm., 9 (1973) 64-66. (Connector rather than concentrator; multistage rather than direct network; probabilistic construction—no reduction to practice.)

G. A. Margulis, "Explicit Constructions of Concentrators", Prob. Info. Transm., 9 (1973) 325-332. (Rearrangeable rather than non-blocking operation.)

A. Feiner and W. S. Hayward, "No. 1 ESS Switching Network Plan", Bell Sys. Tech. J., (1964) 2193-2220. (Instance in practice of sparse crossbar; capacity in excess of accessibility not guaranteed.)

G. M. Masson, "Binomial Switching Networks for Concentration and Distribution", IEEE Trans. on Comm., 25 (1977) 873-883. (Rearrangeable rather than non-blocking operation.)

N. Pippenger, "Telephone Switching Network", Proc. of Symposia in Applied Mathematics, Vol. 26, (1982) 101-133.

U.S. Pat. Nos. 3,935,394, Bulfer, issued Jan. 27, 1976, entitled "Network Routing and Control Arrangement" and 4,245,214, Beirne, issued Jan. 13, 1981, entitled "Switching Matrix".

The cited literature consists of two main groups. The first concerns probabilistic operation of multiple stages of crossbars. These systems reduce the number of crosspoints by using multiple stages and a probabilistic control routine. The second class involves systems which are operated by rearranging busy connections when a new request for connection cannot be made with existing idle outputs.

The prior art systems cited above cannot provide a capacity for handling requests for connections that exceeds the accessibility of a given input to a number of outputs in a single stage crossbar without the rearrangement of existing connections.

SUMMARY OF THE INVENTION

The present invention provides a single stage crossbar and means for controlling the crossbar that provides a capacity for non-blocking connection of input signals to outputs that exceeds the number of outputs to which a given input is connectable. Thus, the capacity of the crossbar is increased using a smaller number of crosspoints in a single stage than was available in the prior art.

In one aspect, the present invention is an apparatus for connecting a signal on one of a plurality of inputs to a non-busy one of a plurality of outputs, comprising a plurality of controllable switches arranged so that each input is connectable to at least an integer q outputs. The invention further comprises a means for controlling the controllable switches to connect the signal to a non-busy output so that no more than an integer f outputs that are connectable to any input become busy due to connections to other inputs, where f is less than q.

In a second aspect, the present invention is a method for controlling a single stage sparse crossbar to connect a signal received on an input to the crossbar to at least one output wherein each input is connectable to at least an integer q outputs and no more than an integer c outputs are shared by any pair of inputs, and c is less than q, comprising the steps of:

(1) maintaining for each output o a parameter $Bad_o$ indicating the number of inputs i connectable to o for which the number of outputs to which the input i is connectable that are busy due to other inputs equals an integer f and a parameter $Busy_o$ indicating whether the output is connected to any input; and (2) connecting, responsive to the parameters $Bad_o$ and $Busy_o$, the signal to a non-bad, non-busy output o so that no more than f outputs that are connectable to any input become busy, where f is less than q.

BRIEF DESCRIPTION OF THE DRAWINGS

FIG. 2 is a diagram of a sparse crossbar implemented according to a preferred embodiment of the present invention.

DETAILED DESCRIPTION

With reference to the drawings, a detailed description of the preferred embodiment is provided.

Figure 1:
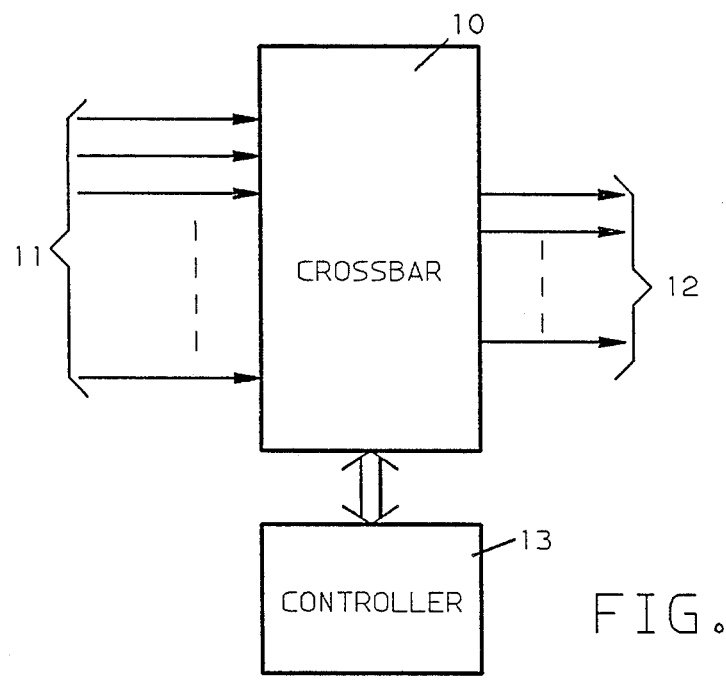
FIG. 1 is a block diagram of an apparatus according to the present invention.

FIG. 1 is a block diagram of an apparatus according to the present invention. The apparatus includes a single stage crossbar 10 to which a plurality of inputs 11 are connected. The inputs are connected by crosspoints to a plurality of outputs 12. A means for controlling the crossbar 13 in communication with the crossbar for controlling the individual crosspoints is also included. When a signal comes in on one of a plurality of inputs 11, the controlling means 13 controls a crosspoint to connect the signal to a non-busy one of the plurality of outputs 12.

A. Theoretical Description

This invention relates to the problem of constructing and operating a concentrator. A concentrator is a network in which inputs are connected to outputs by means of switches arranged in a manner specified below. The present invention is operable as a network that has a single stage (each switch joins some input to some output) and partial access (not all pairs of inputs and outputs are joined by switches).

The present invention is concerned with the operation of such a network as a "wide-sense non-blocking concentrator". In this mode of operation, requests preferably arrive serially, and each request is satisfied before the next one is examined. Whenever a request arrives, the network is in a state wherein certain inputs (the busy inputs) are connected by certain switches to outputs (the busy outputs). Inputs and outputs that are not busy are called idle. A request for connection designates an idle input; to satisfy it, the designated input must be connected by a switch to an idle output; the input and output thereby become busy. A request for disconnection designates a busy input; to satisfy it, the designated input must be disconnected from the output to which it is currently connected; the input and output involved thereby become idle.

The present invention may also be operated in such a way that an input may simultaneously be connected up to an integer b, greater than 1, of outputs, as in a conference call situation.

The invention disclosed here is the use of a network constructed in accordance with a combinatorial geometry and operated in accordance with a policy formulated to increase the capacity of the network beyond that provided by undisciplined operation.

Let GF(q) denote a field with q elements. The inputs of the concentrator will correspond to ordered triples of elements from GF(q) and the outputs will correspond to ordered pairs of such elements. Input (r,s,t) will be joined by a switch to output (x, y) if and only if $rx^2+sx+t=y$. This concentrator has $q^3$ inputs and $q^2$ outputs. Each input has access to q outputs, but any pair of distinct inputs have common access to at most two outputs.

The concentrator described above is to be operated in accordance with the following policy, in which f represents an integer parameter: a request for connection of an idle input shall be satisfied, if possible, in such a way that no idle input is joined by switches to more than f busy outputs; if this is not possible, the request for connection is refused.

If f is chosen to be 2q/3 (where we assume for simplicity that q is divisible by 3), then it is possible to show that whenever a request is refused, at least $q^2/12$ connections must currently be established. If the policy under which the concentrator of the present invention is operated (described above) is not enforced, a request may have to be refused when only q connections are currently established. Thus the enforcement of the policy increases the capacity of the concentrator by a factor of at least q/12.

In the preferred embodiment of the invention any pair of distinct inputs have common access to at most two outputs. The invention can be practiced with any network in which each input has access to at least q outputs, and any pair of distinct inputs have common access to at almost an integer c, less than q outputs.

Many variations of the ideas disclosed here are possible. Concentrators or generalized concentrators may be based on affine or projective geometries, on geometries with dimensions other than two, and on curves or varieties with degrees other than two.

B. Implementation

Figure 2:
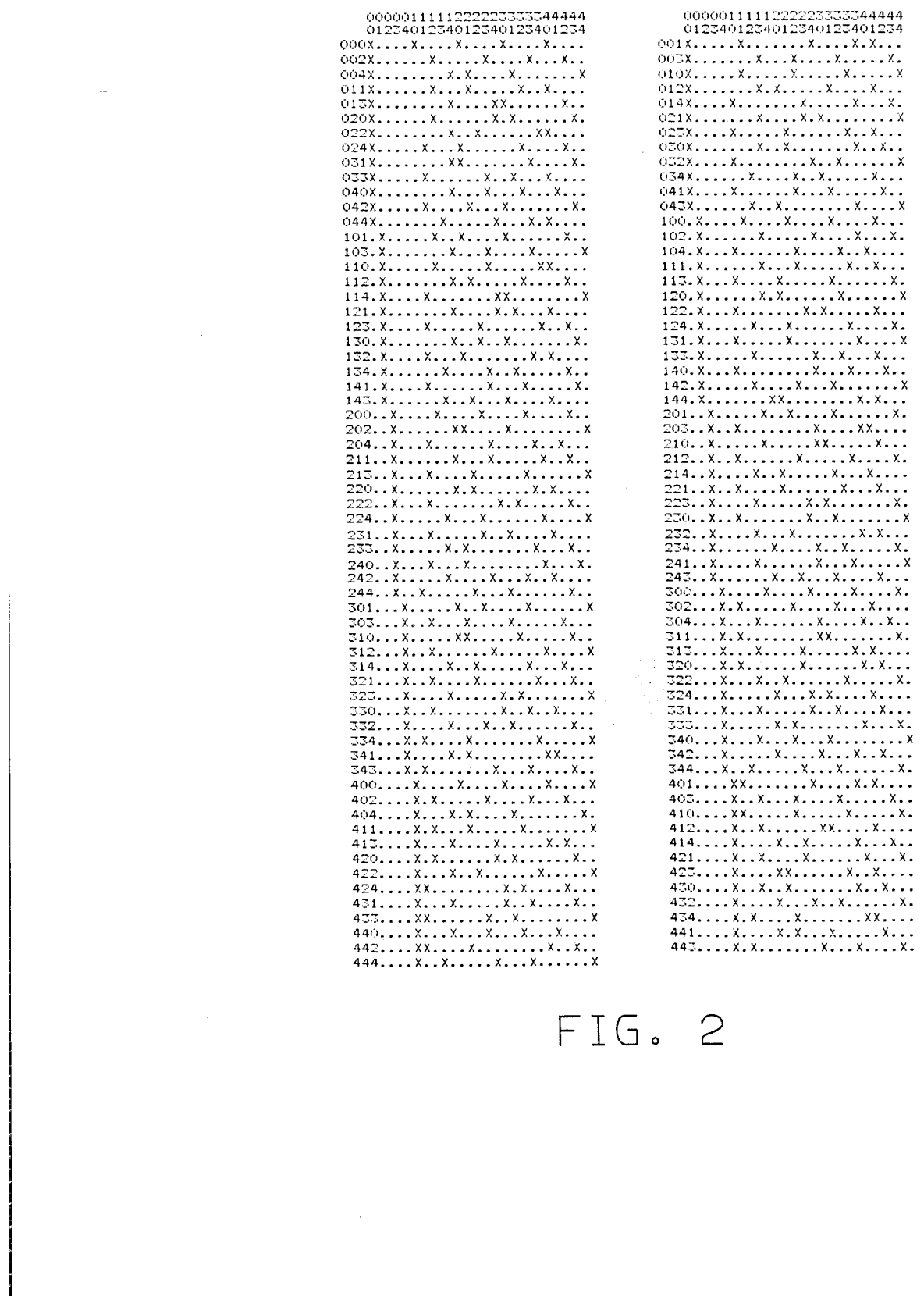

FIG. 2 illustrates the crosspoints in a sparse crossbar corresponding to q equal to 5 and c equal to 2 suitable for implementing a concentrator such as discussed above. The crossbar shown in FIG. 2 can be blocked by q equals 5 calls if used naively, but not by fewer than 9 if b equals 1 and f equals 4 and it is operated according to the present invention.

Accordingly, there are $q^3$ or 125 inputs, designated 000 through 444 (base 5) in FIG. 2. And, $q^2$ or 25 outputs designated 00 through 44 (base 5). The crosspoints are indicated by X's.

In the preferred embodiment, the controlling means 13 is implemented by a software or microcode controlled processor that detects requests for connection by idle inputs and operates the switches at crosspoints to connect the input to an idle output. The controlling means 13 maintains for each input i a parameter $F_i$ indicating the number of outputs to which the input i is connectable that are busy.

The controlling means 13 further maintains for each input i a parameter $B_i$ indicating the number of outputs to which the input is connected at any given time.

The controlling means 13 in the preferred embodiment further includes a means for maintaining for each output o a parameter $Bad_o$ indicating the number of inputs i connectable to o for which the parameter $F_i$ equals f and a parameter $Busy_o$ indicating whether the output is connected to any input.

Figure 3:
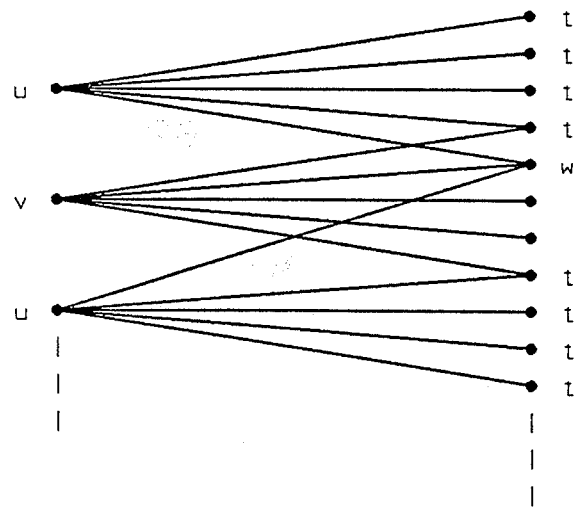
FIG. 3 is a diagram of the connections of some inputs to some outputs used in the explanation of FIGS. 4 and 5.
Figure 4:
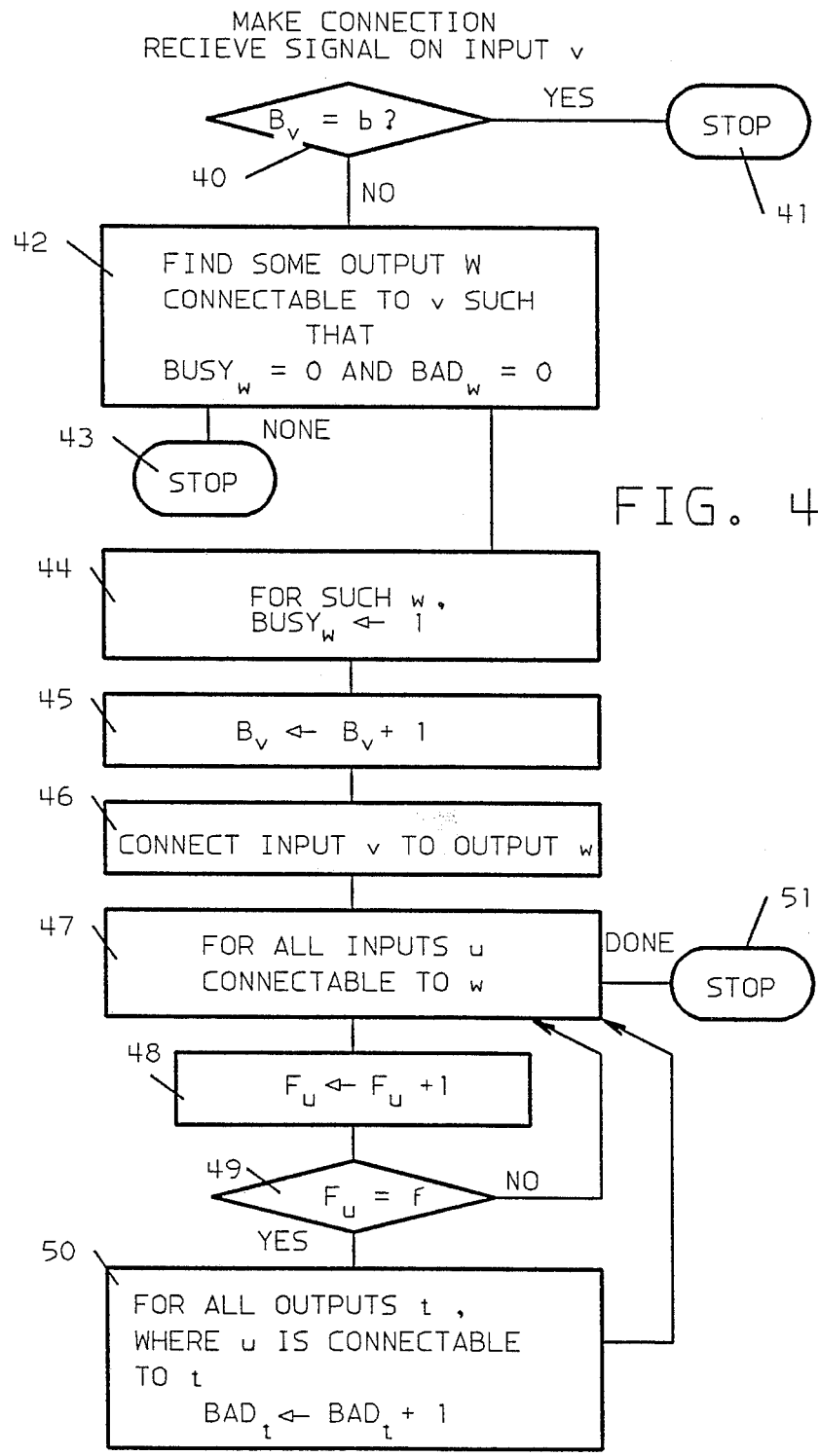
FIG. 4 is a flow diagram illustrating the operation of a control means to make a connection according to the present invention.
Figure 5:
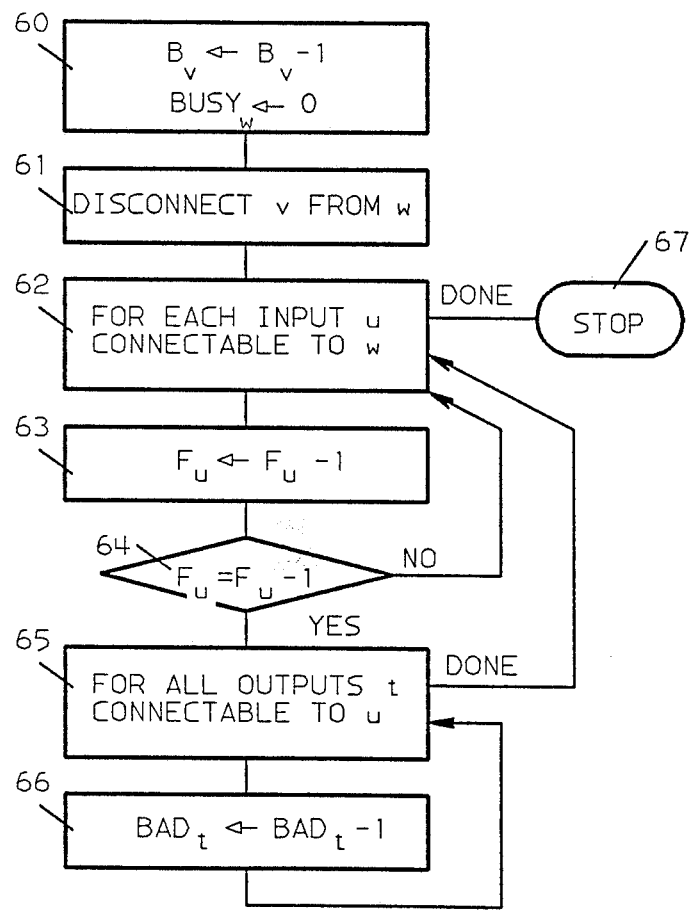
FIG. 5 is a flow diagram illustrating the operation of a control means to break a connection according to the present invention.

FIG. 3 is a schematic diagram of the connections of an input v to an output w showing connections to inputs u and outputs t that are affected in the operation of the controlling means to make the connection v to w or break the connection v from w. The method for making a connection is illustrated in FIG. 4. The method for breaking the connection is illustrated in FIG. 5.

The method for making a connection from input v to an output w is illustrated in FIG. 4. The first step when a signal is received on input v for the controlling means 13 is to test the parameter $B_v$ to determine whether it is equal to b, an integer indicating the maximum number of outputs connected to a given input (block 40). If the parameter is equal to the maximum, then the connection is refused (block 41). If not, then the controlling means find some output w connectable to the input v such that the parameter $Busy_w$ is equal to zero and the parameter $Bad_w$ is equal to zero (block 42). If there are no such outputs, then the request for connection is refused (block 43).

For such output w meeting the test of block 42, the parameter $Busy_w$ is set to 1 (block 44). Further, for the input v, the parameter $B_v$ is incremented by 1 (block 45).

Then the controlling means 13 operates a crosspoint to connect the input v to the output w (block 46).

Next, for all inputs u that are connectable to the output w, (see FIG. 3), the controlling means goes through the following steps to update parameters (block 47).

First, the parameter $F_u$ for all inputs u is incremented by 1 (block 48). Then, for each such input u, the parameter $F_u$ is tested to determine whether it is equal to f (block 49). If the parameter $F_u$ is not equal to f, then the loop continues through the other inputs u. If the parameter $F_u$ is equal to f, then for all outputs t, where the input u is connectable to t (see FIG. 3), the parameter $Bad_t$ is incremented by 1 (block 50). Then the loop to the remaining inputs u is continued. When all such inputs u have been processed, then the controlling means stops (block 51).

In order to break a connection from input v to output w, the controlling means 13 goes through the process illustrated in FIG. 5. Upon the receipt of a request to break a connection, the first step of the controlling means is to decrement the parameter $B_v$ by 1 for the input v and to set the parameter $Busy_w$ for the output w to zero (block 60). Then the controlling means operates the crosspoint to disconnect the input v from the output w (block 61).

Next, the controlling means goes through the following process to update the remaining parameters for each input u that is connectable to the output w, (block 62). For each such u, the parameter $F_u$ is decremented by 1 (block 63). Further, the parameter $F_u$ is tested to determine whether it is equal to f minus 1 (block 64). If not, the loop continues to update the remaining parameters.

If the test of block 64 is true, then for all outputs t that are connectable to the input u, the parameter $Bad_t$ is decremented by 1 (block 65 and 66). When all such outputs t have had their parameters corrected, then the loop continues. When all such inputs u have been updated, then the controlling means stops (block 67).

C. Conclusion

The present invention has been described with reference to a preferred embodiment thereof. Those skilled in the art will recognize that many variations of the embodiment disclosed can be made that fall within the spirit and scope of the invention. It is intended that the scope of the invention be defined by the claims attached hereto.

We claim:

1. An apparatus wherein each of a plurality of inputs is connectable by controllable switches to a preselected plurality of at least q outputs and each output is connectable to a preselected plurality of inputs, but at any one time, each output is connected to at most one input, said apparatus comprising:
   means for detecting a request from one of the inputs for connection to any then nonconnected output;
   means for ascertaining which of the outputs connectable to the requested input are not then connected;
   means for determining which of the connectable but not connected outputs satisfy the condition that, if the requesting input were connected to them, then no more than an integer f outputs that are connectable to any input would become connected to other inputs, where f is less than q; and
   means for connecting the requesting input to one of the outputs satisfying said condition.

2. The apparatus of claim 1, wherein the controllable switches are further arranged so that no more than an integer c outputs are connectable to both of any pair of inputs, and c is less than q.

3. The apparatus of claim 1, wherein the apparatus further includes:
   means for preventing the requesting input from being connected to more than an integer b outputs where b+f is less than or equal to q.

4. The apparatus of claim 1, including:
   means for maintaining for each input i a parameter $F_i$ indicating the number of outputs to which the input i is connectable that are connected to other inputs; and
   means for maintaining, for each output o, a parameter $Bad_o$ indicating whether the output is connectable to an input i for which the parameter $F_i$ equals f, and a parameter $Busy_o$ indicating whether the output is connected to any input; and
   means for connecting the requesting input to an output o responsive to the parameters $Bad_o$ and $Busy_o$.

5. The apparatus of claim 4, further including:
   means for maintaining for each input i a parameter $B_i$ indicating the number of outputs to which the input is connected.

6. The apparatus of claim 1, wherein the plurality of controllable switches comprise a single stage sparse crossbar.

7. A method for controlling connection of each of a plurality of inputs to a preselected plurality of at least q outputs wherein each output is connectable to a preselected plurality of inputs, but at any one time, each output is connected to at most one input, said method comprising the steps of:
   detecting a request from one of the inputs for connection to any then nonconnected output;
   ascertaining which of the outputs connectable to the requesting input are not then connected;
   determining which of the connectable but not connected outputs satisfy the condition that, if the requesting input were connected to them, then no more than an integer f outputs that are connectable to any input would become connected to other inputs, where f is less than q; and
   connecting the requesting input to one of the outputs satisfying said condition.

8. The method of claim 7, wherein no more than an integer c outputs are connectable to both of any pair of inputs, and c is less than q.

9. The method of claim 7, including the step of: preventing the input from being connected to more than an integer b outputs, where b+f is less than or equal to q.

10. The method of claim 7, wherein the determining step includes:
    maintaining for each input i a parameter $F_i$ indicating the number of outputs to which the input i is connectable that are connected to other inputs; and
    maintaining for each output o a parameter $Bad_o$ indicating whether the output is connectable to an input i for which the parameter $F_i$ equals f and maintaining a parameter $Busy_o$ indicating whether the output is connected to any input.

11. The method of claim 10, wherein the connecting step includes connecting the requesting input to an output o responsive to the parameters $Bad_o$ and $Busy_o$.

12. The method of claim 10 including the step of:
    maintaining for each input i a parameter $B_i$ indicating the number of outputs to which the input is connected.

* * * * *